United States Patent
Hyldtoft et al.

[11] Patent Number: 5,997,835
[45] Date of Patent: Dec. 7, 1999

[54] PROCESS FOR STEAM REFORMING OF HYDROCARBONS

[75] Inventors: Jens Hyldtoft, Kokkedal; Jens Kehlet Nørskov, Lyngby; Bjerne Steffen Clausen, Vedbæk, all of Denmark

[73] Assignee: Haldor Topsøe A/S, Lyngby, Denmark

[21] Appl. No.: 09/095,408

[22] Filed: Jun. 10, 1998

[30] Foreign Application Priority Data

Jun. 10, 1997 [DK] Denmark ................... 0683/97

[51] Int. Cl.[6] .................................... C01B 3/26
[52] U.S. Cl. ............... 423/418.2; 252/373; 423/654
[58] Field of Search ................... 423/654, 418.2; 252/373

[56] References Cited

U.S. PATENT DOCUMENTS

| | | | |
|---|---|---|---|
| 3,666,412 | 5/1972 | Sowards | 423/654 |
| 3,791,993 | 2/1974 | Rostrup-Nielsen | 252/466 |
| 3,926,583 | 12/1975 | Rostrup-Nielsen | 48/214 |
| 4,060,498 | 11/1977 | Kawagoshi et al. | 252/373 |
| 5,595,719 | 1/1997 | Ul-Haque et al. | 423/654 |

FOREIGN PATENT DOCUMENTS

| | | |
|---|---|---|
| 0470626 | 4/1995 | European Pat. Off. . |
| 2015027 | 9/1979 | United Kingdom . |

*Primary Examiner*—Wayne Langel
*Attorney, Agent, or Firm*—Ostrolenk, Faber, Gerb & Soffen, LLP

[57] ABSTRACT

Process for catalytical steam reforming a carbonaceous feedstock without any carbon formation, wherein the feedstock is contacted with a nickel catalyst further including gold in an amount of 0.01 to 30% by weight calculated on the amount of nickel in the catalyst.

4 Claims, 1 Drawing Sheet

Carbon formation

PROCESS FOR STEAM REFORMING OF HYDROCARBONS

BACKGROUND OF THE INVENTION

1. Filed of the Invention

The present invention is related to the production of hydrogen and/or carbon monoxide rich gases by steam reforming of hydrocarbons. In particular, the present invention involves a gold containing nickel reforming catalyst for use in the steam reforming of a hydrocarbon feedstock.

2. Description of the Related Art

In the known processes for the production of hydrogen and/or carbon monoxide rich gases, a mixture of hydrocarbons and steam and/or carbon dioxide is passed at elevated temperature and pressure through a reactor packed with a catalyst, mainly consisting of nickel as the active catalytic component.

Hydrocarbon feedstocks suitable for steam reforming are for instance natural gas, refinery off gases, propane, naphtha and liquified petroleum gases. Taking methane as an example, the reactions which take place can be represented by the following equations:

$$CH_4 + H_2O \rightarrow CO + 3H_2 \quad (1)$$

$$CH_4 + CO_2 \rightarrow 2CO + 2H_2 \quad (2)$$

$$CO + H_2O \rightarrow CO_2 + H_2 \quad (3)$$

In addition to the reforming reactions (1) and (2), certain carbon forming reactions may occur as follows:

$$CH_4 \rightarrow C + 2H_2 \quad (4)$$

$$2CO \rightarrow C + CO_2 \quad (5)$$

The carbon thereby formed is detrimental in several ways. It decreases the activity of the catalyst by blocking its active sites. Carbon formation may further cause spalling and pulverization of the catalyst particles, resulting in increasing pressure drop over the catalyst bed and hence discontinuation of the reforming operation due to clogging of the reactor.

It is well known to prevent carbon formation by increasing the steam to hydrocarbon ratio in the process gas or by reducing the molecular weight of the feedstock to reduce the potential for carbon formation.

However, increased steam to hydrocarbon ratio will lead to reduced yields of Co by shifting more carbon monoxide over to carbon dioxide. Thus, in order to maintain $CO/H_2$-production at the desired production rate, larger amounts of catalyst and feedstock are required, which depreciate the economy of the reforming process.

Various attempts have been made to overcome carbon deposition without affecting the optimum steam to hydrocarbon ratio.

A method of preventing carbon formation during the is reforming process for the preparation of reducing gases with a high reduction potential is mentioned in GB patent No. 2,015,027. By the disclosed process a feed gas rich in methane is reformed over a supported nickel catalyst in the presence of 2 to 10 ppm by volume sulphur or sulphur compounds in the feed. Thereby, the presence of sulphur counteracts carbon formation and ensures satisfactory reforming activity of the catalyst to form carbon monoxide and hydrogen.

Furthermore, several catalysts giving decreased carbon deposition have been suggested in the past. In general, the prior art catalysts having a suppression effect upon carbon deposition mainly consist of nickel with alkali promoter. Disadvantages of the alkali promoted catalysts are low activity and the mobility of the alkali metals, which cause migration and evaporation of the alkali promoter during the operation of the catalyst.

Catalysts free of alkali metals are suggested in U.S. Pat. No. 3,926,583, by which a nickel, iron or cobalt reforming catalyst is prepared by reducing a precursor comprising an intimate mixture of magnesium aluminum spinel with a mixed solid phase of the oxides of nickel, iron or obalt and in U.S. Pat. No. 3,791,993, disclosing a nickel, iron or cobalt, magnesium oxide reforming catalyst. Other promoters have been suggested in the art. U.S. Pat. No. 4,060,498 mentions a steam reforming process with a silver promoted nickel catalyst on a heat resistant oxide carrier. Furthermore, EP Patent No. 470,626 states the effect of Group IVa and Va metals suppressing the carbon formation. Amounts between 0.1 to 30% by weight calculated on the amount of metallic nickel, of germanium, tin, lead, arsenic, antimony and bismuth are included in the nickel containing catalyst.

Elements from Group Ib are not included in this patent, and in the literature, it is stated that addition of gold has no effect neither on carbon formation nor on the reforming activity (Mono and bi-metallic catalysts for steam reforming, Ph.D. Thesis by Isar-Ul Haque, University of New South Wales, 1990).

Recent STM studies (L. P. Nielsen et. al., Phys. Rev. Lett. 71 (1993) 754) have shown that gold may form an alloy in the surface of a nickel single crystal although these two elements are immiscible in the bulk. Furthermore, calculations using the density functional theory, predicts that addition of small amounts of gold will alter the reactivity of the neighbouring nickel atoms (P. Kratzer et al., J. Chem. Phys. 105 (13)(1996) 5595). Molecular beam studies of single crystals of nickel promoted with small amounts of gold have confirmed this (P. M. Holmblad et. al., J. Chem. Phys. 104 (1996) 7289).

Thus, it is the main object of this invention to prevent carbon deposition in the steam reforming of hydrocarbons.

We have now observed that addition of small amounts of gold to a nickel containing catalyst provides a catalyst with suppressed carbon deposition during steam reforming of hydrocarbons. Though gold decreases the catalytic activity of the nickel catalyst, the catalyst still provide sufficient activity for the steam reforming. EXAFS confirms that the gold is located at the nickel surface (Annual Report from HASYLAB, 1996).

DETAILED DESCRIPTION OF THE PREFERRED EMBODIMENTS

Figure 1:
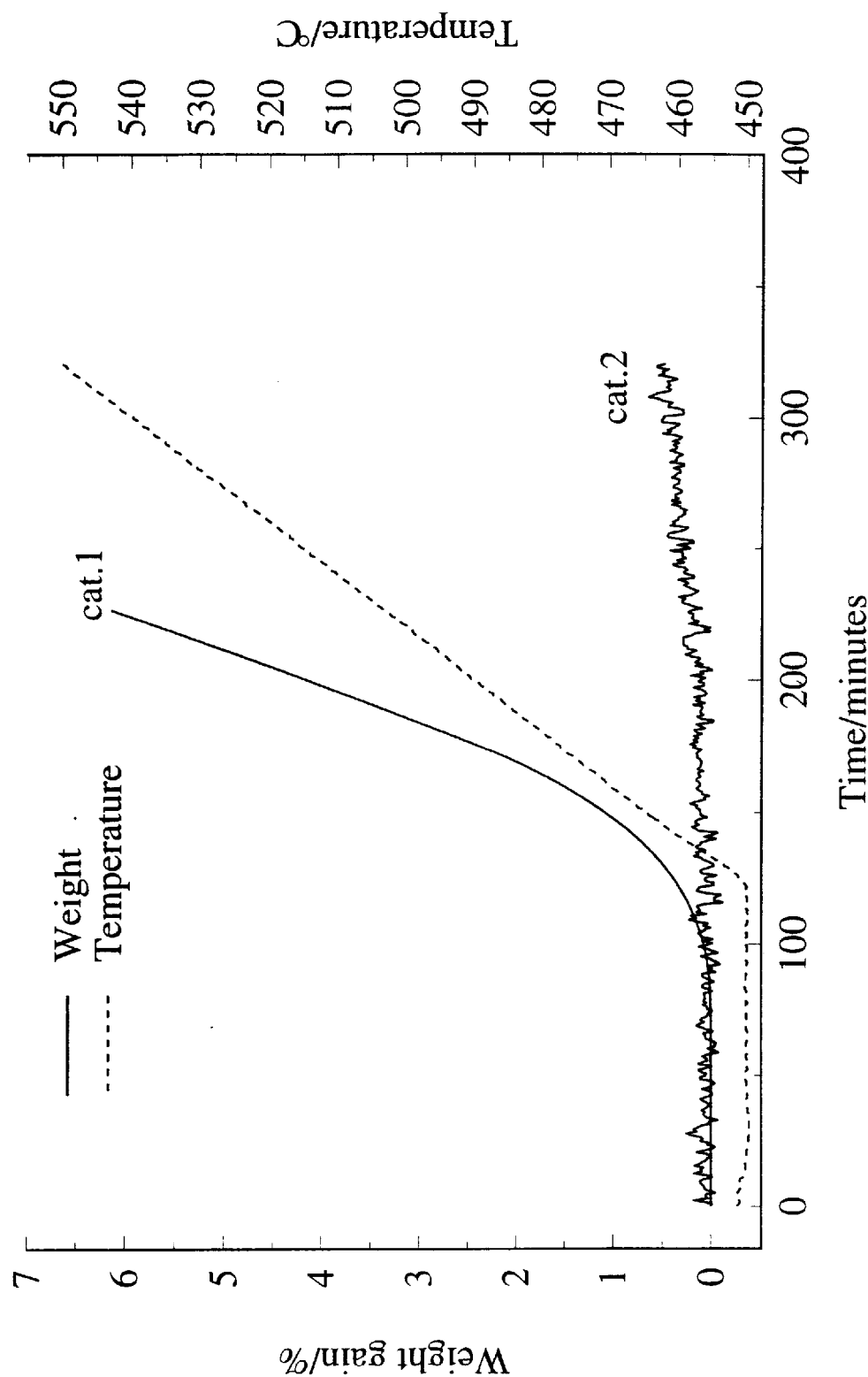
FIG. 1 provides a comparison of the resistance to carbon formation during steam reforming between the catalyst of the invention and a conventional nickel reforming catalyst.

Based on the above observation, a broad embodiment of the invention is directed towards a process for catalytically steam reforming of a carbonaceous feedstock without carbon formation, wherein carbon forming reactions occurring during the steam reforming are substantially reduced by contacting the feedstock with a supported nickel catalyst further including gold in an amount of 0.01% to 30% by weight calculated on the amount of nickel in the catalyst.

The amount of gold incorporated in the catalyst will depend on the nickel surface area.

The gold containing nickel catalyst may be prepared by coimpregnation or sequentially impregnation of the carrier material with solutions containing a soluble nickel salt and a salt of the gold promoter. Suitable salts include chlorides, nitrates, carbonates, acetates or oxalates.

Carrier materials are conveniently selected from the group of alumina, magnesia, titania, silica, zirconia, beryllia, thoria, lanthania, calcium oxide and compounds or mixtures thereof. Preferred materials comprise alumina, calcium aluminates and magnesium aluminum spinel. The promoted catalyst, thus obtained, can be used in the production of hydrogen and/or carbon monoxide rich gases by steam reforming of methane or higher hydrocarbons.

The hydrogen and/or carbon monoxide rich gases obtained may be used in many processes, hydrogen. Hydrogen is used worldwide in refineries, while mixtures of hydrogen and carbon monoxide are for instance employed in the synthesis of oxygenated hydrocarbons and synthetic fuels. An important use of hydrogen-rich gas is in the preparation of ammonia and methanol.

The nickel-gold catalyst are typically arranged as fixed bed in a top feeded tubular reforming reactor. Depending on the process conditions, the potential for carbon formation will typically be highest at the toplayer in tube. Thus, it may be sufficient to arrange the nickel-gold catalyst as a layer in the upper portion of a fixed bed of conventional nickel steam reforming catalyst. Thereby, the nickel-gold catalyst layer preferably constitutes 5% to 50% of the catalyst bed.

The invention will be further described in the following Examples.

EXAMPLE 1

Steam reforming activity.

A series of nickel/gold catalyst samples containing 17% by weight of nickel and containing varying contents of gold were prepared by sequential impregnations of a spinel carrier with nickel nitrate and goldtetramminnitrate, [Au(NH$_3$)$_4$] (NO$_3$)$_3$. Before the impregnation with the gold precursor, the nickel nitrate was decomposed. After drying, the catalyst pellets were loaded in a reactor and activated during heating to 350° C. in flowing hydrogen at atmospheric pressure.

The steam reforming activity was determined under the following conditions:

| | |
|---|---|
| Catalyst size, mm | 4 × 4 |
| Catalyst amount, g | 0.2 |
| Temperature, ° C. | 400–650° C. |
| Feed gas composition, Nl/h | |
| CH$_4$ | 4.0 |
| H$_2$O | 16.0 |
| H$_2$ | 1.6 |

The activities obtained at 550° C. are shown in Table 1.

TABLE 1

| Steam reforming activity at 550° C. | | |
|---|---|---|
| | 100 · Au/Ni Weight/Weight | Relative Activity |
| Cat. 1 | 0.00 | 100 |
| Cat. 2 | 1.85 | 65 |

As apparent from Table 1, there is a minor decrease in steam reforming activity for the gold containing nickel catalysts compared to the pure nickel catalyst.

EXAMPLE 2

TGA measurements

The rates of carbon deposition on the reforming catalysts during steam reforming of butane prepared under Example 1 were measured gravimetrically for various values of temperature between 450° C. to 550° C. The temperature was increased by 0.5° C./min. A conventional experimental set-up comprising a heated reactor tube associated with an on-line microbalance was used for the measurement. One catalyst pellet (0.1 g) was placed on the basket suspended from one arm of the microbalance. The total flow rate and the concentration of the feed stream passed over the catalyst pellet is given below:

Total flow rate=21,82 Nl/h

Butane=3,76 vol %

Steam=22,91 vol %

Hydrogen=4,58 vol %

Nitrogen=68,74 vol %

The rate of carbon formation at the above conditions is depicted in FIG. 1 showing the amount of carbon (μg carbon/g catalyst·100) at different temperatures (° C.·1000) deposited on:

Cat. 2, prepared under-Example 1;

in comparison to the conventional nickel reforming catalyst, also prepared under Example 1.

As apparent from the FIG. , the catalyst according to the invention provides a highly improved resistance to carbon formation during steam reforming.

Although the present invention has been described in relation to particular embodiments thereof, many other variations and modifications and other uses will become apparent to those skilled in the art. Therefore, the present invention is to be limited not by the specific disclosure herein, but only by the appended claims.

We claim:

1. Method for suppressing the formation of solid carbon during a process for catalytical steam reforming of a hydrocarbon feedstock comprising contacting said feedstock with a supported nickel catalyst further including gold in an amount of 0.01% to 30% by weight calculated on the amount of nickel in the catalyst.

2. The method of claim 1, wherein the amount of gold is between 0.001% and 10% by weight calculated on the total catalyst weight.

3. The method of claim 1, wherein the gold containing nickel catalyst is arranged as a toplayer in a fixed bed of a nickel steam reforming catalyst.

4. The method of claim 3, wherein the toplayer constitutes between 5% and 50% of the total catalyst bed.

* * * * *